Dec. 11, 1962    E. J. HABOUSH    3,067,740
HIP JOINT PROSTHESIS
Filed Sept. 8, 1959    2 Sheets-Sheet 1
FIG.1.
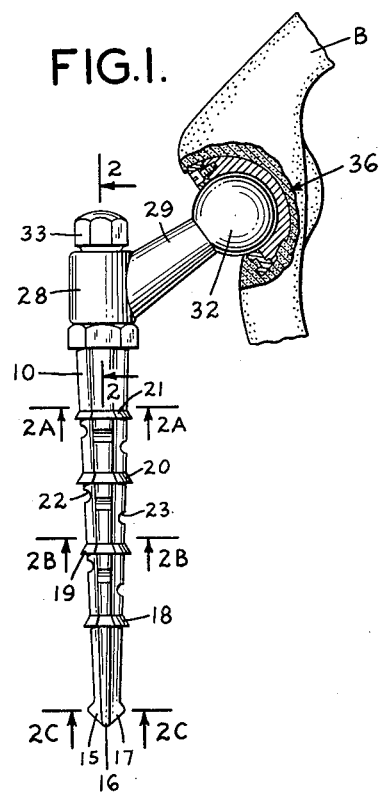
FIG.3.
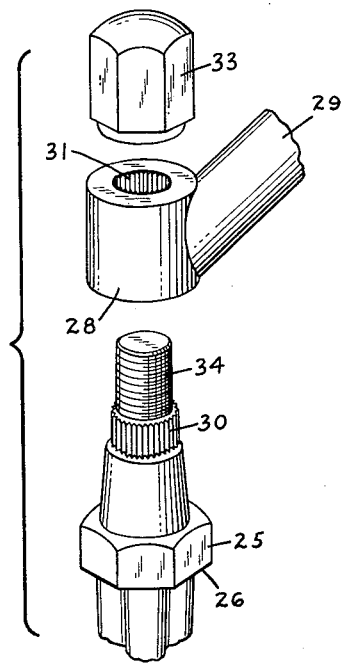
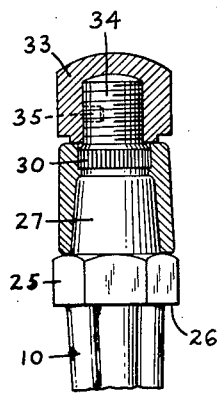
FIG.2.
FIG.2A.
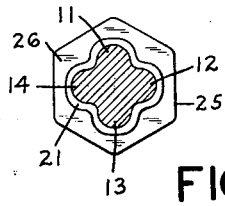
FIG.2B.
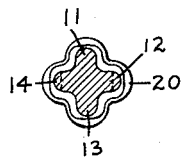
FIG.2C.
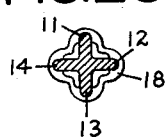
INVENTOR
EDWARD J. HABOUSH
BY
HIS ATTORNEYS Dec. 11, 1962  E. J. HABOUSH  3,067,740
HIP JOINT PROSTHESIS
Filed Sept. 8, 1959  2 Sheets-Sheet 2

INVENTOR
EDWARD J. HABOUSH
BY
HIS ATTORNEYS

United States Patent Office 3,067,740
Patented Dec. 11, 1962

3,067,740
HIP JOINT PROSTHESIS
Edward J. Haboush, 59 E. 79th St., New York, N.Y.
Filed Sept. 8, 1959, Ser. No. 838,528
5 Claims. (Cl. 128—92)

This invention relates to surgical apparatus and it relates particularly to an improved form of hip joint prosthesis by means of which damage to the ball and/or socket of the hip joint can be repaired surgically.

In order to effect a repair of a hip joint which has been damaged it has been proposed to replace a damaged head of the femur with a metallic ball and also to insert in the hip bone a metal socket for receiving the ball. The use of a metal socket as well as a metallic male head prosthesis is intended to eliminate pain, wandering of a ball in the acetabulum and to diminish motion of the hip. In theory, if such a ball and socket joint is properly designed, it may be inserted with little or no more surgery than is required for replacing the damaged neck and head of the femur with the present available male prosthesis. However, as a practical manner, the metallic ball and socket joints designed heretofore have been difficult to use and apply and have not been completely satisfactory.

Anatomically the acetabulum is not truly spherical nor quite a hemisphere. For these and other reasons, the use of a metallic ball and socket hip joint that just fills the acetabulum is mandatory to assure stability and fixation of the socket with respect to the hip bone.

In accordance with the present invention, a hip joint prosthesis including a metallic male ball head and a socket for receiving the head are provided and arranged in such a manner that the socket fits within the acetabulum and can be firmly anchored with respect thereto so that tension and compression stresses exerted thereon during the use of the leg are distributed uniformly in such a manner as to avoid the development of pain at the location of the socket. More particularly, the socket is provided with projecting ears or eyes which engage the hip bone at selected points to act as rests and stabilizers for the entire socket. The stabilizers or rests prevent drifting or movement of the ball and socket in case there is some post operative bone absorption and they also coact with suitably constructed screw clamps to anchor and position the socket rigidly in the hip bone.

The male ball element which cooperates with the socket in accordance with the present invention is also designed and constructed so that it can be firmly anchored in the femur but nevertheless can be adjusted so as to maintain the proper angle of anteversion with respect to the foot and the socket. The ball joint member which preferably takes the form of a nail to be driven axially of the femur is provided with means which permits the adjustment of the neck and the ball thereon angularly around the nail after it has been inserted in the femur so that when the ball is properly adjusted, the patient's foot will align properly and will not "toe out" or "toe in" when in use. This arrangement of the ball member for adjustment relative to the femur after insertion of the anchoring male constitutes a great advance over the prior art male prosthesis which must be accurately aligned during the application to the femur and thus require great precision in the surgical repair of the hip joint.

For a better understanding of the present invention, reference may be had to the accompanying drawings in which:

FIGURE 1 is a view in the side elevation of a hip joint prosthesis embodying the present invention with the socket member of the prosthesis shown in section and seated in the hip bone;

FIGURE 2 is a view in cross section taken on lines 2—2 of FIGURE 1;

Figure 4:
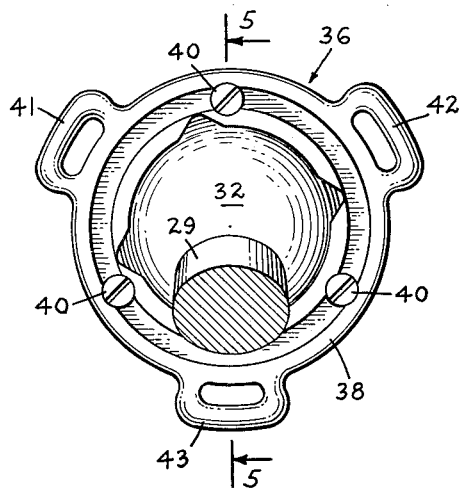
Figure 5:
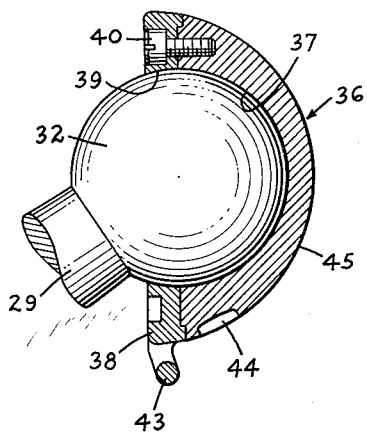

FIGURES 2a, 2b and 2c are views in section taken respectively on lines 2a—2a, 2b—2b and 2c—2c of FIGURE 1;

FIGURE 3 is an exploded view in perspective showing the connection between the male and the neck and ball elements of the prosthesis mounted thereon;

FIGURE 4 is a view in front elevation of the prosthesis with the neck of the male prosthesis element broken away;

FIGURE 5 is a view taken on line 5—5 of FIGURE 4; and

Figure 6:
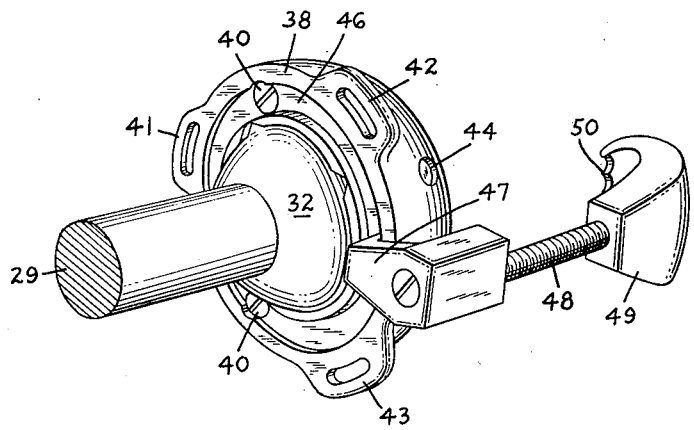

FIGURE 6 is a perspective view of the ball and socket joint illustrating a clamp for securing the socket to the hip bone.

It will be understood that hip joint prosthesis of the type described herein are used in instances where there has been such damage to the hip joint, to the neck of the femur or to the femur itself so that it will not normally heal and cannot readily be reinforced sufficiently to enable it to be used normally. In such cases, it is now rather common to remove the ball or head and a portion or all of the neck of the femur and replace it with a corrosion-resistant artificial ball member which in some instances seats directly in the acetabulum of the hip bone.

The new hip joint prosthesis according to the present invention is constructed and arranged to replace the neck and ball or head of the femur. To that end, in the surgery required for introduction of the hip joint, the neck, ball and upper end of the femur are removed and a nail or pin of the type disclosed in FIGURES 1 to 3 of the drawings is driven into the upper end of the femur. In order to strengthen the nail, it is provided with a series of longitudinally extending ribs 11, 12, 13 and 14 as illustrated in FIGURES 2a, 2c, the ribs tapering downwardly in cross section and having downwardly converging ends 15, 16 and 17 to facilitate the insertion of the nail into the femur. In order to anchor the nail more firmly, it is provided with a series of circumferential scraping or cutting edges 18, 19, 20 and 21 which tend to shave the bone slightly and force it down and pack it around the ribs of the nail as the nail is driven into the femur thereby facilitating subsequent callus formation. Notches 22, 23, etc., are provided along the length of the ribs to receive the bone scrapings or chips and thereby also aid in anchoring the nail firmly in the femur and allow it to bear weight immediately. The tapered shape of the nail, which may be tapered one-half inch in ten inches of length facilitates insertion of the nail in the bone and also assures a good fit, thereby avoiding cocking and breaking through the lateral aspect of the femoral shaft distally. The quadrofoil shape of the nail distributes stresses on the bone in all planes, and affords spaces for new circulating channels.

At the upper end of the nail is a shoulder member which may take the form of a hexagonal head 25 which provides an abutment shoulder 26 limiting the extent to which the nail can be driven into the bone. Directly above the head 25 is a tapered or frusto-conical section 27 which is adapted to receive a complementally shaped socket member 28 which carries an arm 29 thereon corresponding to the neck of the femur. Directly above the tapered section 27 is a serrated portion 30 which is adapted to engage a complementally serrated portion 31 of the collar. The provision of the serrated portions 30 and 31 and the tapered section 27 enable the arm 29 and the ball 32 thereon to be adjusted angularly with respect to the femur thereby to obtain the proper angle of anteversion of the neck of the femur with respect to the patient's foot. After adjustment of the socket member 28 with respect to the nail, it can be clamped in position by means of a cap nut 33 which is received on the threaded upper end portion 34 of the nail 10. If desired, a resilient locking plug 35 or other equivalent locking means may be provided to prevent loosening of the nut on the nail.

The arrangement of the serrated and tapered portions of the nail can be modified considerably. For example, the serrated portion 30 may be adjacent to the lower end of the tapered portion 27 instead of above it. This arrangement facilitates somewhat the angular adjustment of the sleeve 28. The nut 33 may also be modified and arranged so that it extends partially into the sleeve 28, thereby reducing the combined length of the portions 27, 30 and 34.

It will be understood that the nail and the element associated therewith are formed of a corrosion-resistant metal.

Cooperating with the nail member 10 and the ball 32 thereon is a socket 36 which is especially constructed and arranged in accordance with the present invention to stabilize it with respect to the hip bone B as shown in FIGURE 1 and to prevent it from wandering, tilting or drifting in such a manner as to apply unequal stresses to the hip bone which might result in discomfort or improper operation of the hip joint. In accordance with the invention, the acetabulum or socket in the hip joint is gauged or measured to determine the size of the socket 36 to be inserted therein and the acetabulum is then reamed out, if necessary, in order to fit the socket 36 accurately. Socket 36 is of generally semispherical form and is provided with a ball-receiving cavity 37 which is essentially hemispherical in shape and is eccentric to the outer wall of the socket 36. The ball 32 which is truly spherical is retained in the socket by means of a clamping or retaining ring 38 which, as best shown in FIGURES 4, 5 and 6, has an inner peripheral surface 39 which is complemental to the surface of the ball 32. Thus, when the ring 38 is secured to the front of the socket member 36 by means of a series of screws 40, the ball is retained in the socket wtih capacity for a limited universal rocking movement relative thereto. The provision of essentially spherical mating surfaces on the ball and socket is most important in order to assure uniform distribution of stresses and to reduce wear to a minimum thereby assuring long life to the prosthesis.

Projecting from the peripheral edge of the ring 38 are a series of stabilizing ears 41, 42 and 43 which are spaced about 120° apart. These stabilizing ears are positioned so that one of them will rest on the superior ramus of the pubis, the second lies on the outer surface of the iliac portion of the acetabulum and the third rests on the superior ramus of the ischium. These stabilizers prevent the socket 36 from shifting or wandering with respect to the hip bone even if there is some post-operative bone absorption. Moreover, tissues and the bone may, in some instances, grow into or through the stabilizing ears, thereby even more securely anchoring the socket 36 in the hip bone.

To further assure stabilizing of the socket, it may be provided with a series of recesses 44 in its outer surface 45 into which bone may grow. Moreover, the outer surface of the ring is provided with a groove 46 for receiving the end of a clamp member 47 of hook-like form which carries rotatably a screw 48 threadedly engaging in a hook-like clamping element 49. The clamping elements 47, 48 and 49 can be positioned around the socket to engage the hip bone at the "waist" or in the ischial or superior ramus areas and may be tightened by adjusting the screws 48 thereby to clamp the socket securely to the hip bone. It will be understood that the clamps themselves may be formed of corrosion-resistant material and they may also be provided with a locking device to prevent loosening of the screw. The clamping element or jaw 49 may also be provided with teeth 50 for assuring a firmer engagement with the hip bone. One or more of these clamps may be used as required.

With the arrangement of elements shown and described above, it will be apparent that the new prosthesis avoids a metal-to-bone contact. By providing for adjustment of the ball angularly with respect to the femur, the difficulties which have been encountered in obtaining the proper angle of anteversion are completely overcome. Moreover, the new socket element of the prosthesis is constructed and arranged so that it can be firmly embedded in the hip bone and anchored thereto without any possibility of its drifting or wandering with respect to the hip bone. In addition, the arrangement of elements is such that a large surface contact between the socket and the hip bone is provided thereby distributing the stresses so that the pressure per square inch exerted on the hip bone during walking by the patient is properly distributed and cannot cause discomfort or pain or dislodgement of the socket member. By properly designing the ball, the neck portion 29 and the nail 10 it is possible to provide strength capable of easily withstanding the maximum stresses that will be exerted on the joint without producing an unnecessary heavy or cumbersome arrangement. Moreover, the arrangement of the ball and socket is such that when the leg is unsupported, the ball cannot become dislodged from the socket and resistance of the clamping element is such as to prevent dislodgement of the socket from the acetabulum or the hip bone or shifting or actual motion of the hip joint relative to the hip bone. Accordingly, it will be apparent that the new hip joint prosthesis overcomes all of the difficulties which have been encountered heretofore with such prostheses and a very effective and satisfactory structure is thereby provided which due to its adjustability can be applied surgically with little difficulty.

It will be understood that the prosthesis may be made in different sizes to satisfy different requirements and accordingly the form of prosthesis described herein should be considered as illustrative.

I claim:

1. A hip joint prosthesis comprising a socket member having a semispherical cavity therein, a ball member engaging in the said cavity for limited universal movement relative thereto, means on said socket member engaging said ball to retain it in said cavity, an arm extending substantially radially from said ball and having a tubular sleeve at its outer end inclined at an obtuse angle to said arm, an elongated nail member having one end engaging in said sleeve and extending at an obtuse angle to said arm, interfitting, substantially complemental, non-circular portions on said sleeve and said nail member, said sleeve and said nail member being movable relatively axially in one direction to disengage said non-circular portions and enable said arm to be adjusted angularly around the axis of said nail member, said nail member and sleeve being movable axially relatively in the opposite direction to engage said non-circular portions and retain said nail member and said sleeve against relative angular movement, and means for securing said nail member to said sleeve with said non-circular members in engagement.

2. A hip joint prosthesis comprising a femur-engaging member, an arm, a sleeve fixed to one end of said arm and mounted on and movable around said member adjacent to one end thereof, complemental, interfitting, non-circular portions on said sleeve and said member engageable by relative endwise movement of said sleeve and said member for retaining said sleeve against movement around said member, means for releasably retaining said sleeve and said member with said interfitting portions in engagement and a ball on the opposite end of said arm from said sleeve.

3. A hip joint prosthesis comprising a ball member, an arm extending substantially radially from said ball member and having a tubular sleeve on its outer end disposed at an obtuse angle to said arm, an elongated femur-engaging member having at one end a portion of circular cross-section and an adjacent portion of non-circular cross-section, said sleeve having circular and non-circular inner wall portions substantially complemental to said circular and non-circular portions of said femur-engaging member, said circular and non-circular portions of said femur-engaging member being insertable in said sleeve and rotatable relative thereto when partially inserted therein and only said circular portions are engaged, said femur-engaging member being non-rotatable relative to said sleeve when fully inserted therein and said complemental non-circular portions are engaged, and means for releasably retaining said femur-engaging member in said sleeve with said non-circular portions engaged.

4. A hip joint prosthesis comprising a socket member having a semispherical cavity therein for receiving a portion of a ball member, a ring-like retaining member having an inner concave periphery substantially complemental to and engageable with a portion of said ball outwardly of said socket, means for connecting said ring to said socket member to retain said ball in said socket and a plurality of apertured ears on and angularly spaced around said retaining member and extending outwardly from its periphery.

5. The prosthesis as set forth in claim 4 comprising screw clamps for engaging said retaining member and the hip bone to fix said socket member and retain it relative to said hip bone.

References Cited in the file of this patent

UNITED STATES PATENTS

| | | |
|---|---|---|
| 2,668,531 | Haboush | Feb. 9, 1954 |
| 2,719,522 | Hudack | Oct. 4, 1955 |
| 2,765,787 | Pellet | Oct. 9, 1956 |

FOREIGN PATENTS

| | | |
|---|---|---|
| 1,047,640 | France | July 22, 1953 |

OTHER REFERENCES

Journal of Bone and Joint Surgery, July 1952, page 19. (Copy in Scientific Library.)